(12) United States Patent
Kuroki

(10) Patent No.: US 8,705,056 B2
(45) Date of Patent: Apr. 22, 2014

(54) PRINTER FOR RECEIVING DIRECT PRINTER REQUESTS AND MAPPING FEATURES OF THE REQUESTS TO REQUIRED SETTINGS

(75) Inventor: Jun Kuroki, Superior, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 141 days.

(21) Appl. No.: 13/076,343

(22) Filed: Mar. 30, 2011

(65) Prior Publication Data
US 2012/0250052 A1 Oct. 4, 2012

(51) Int. Cl.
*G06F 3/12* (2006.01)
(52) U.S. Cl.
USPC ............... 358/1.13; 358/1.9; 358/1.15
(58) Field of Classification Search
CPC .............. G06K 15/1809; G06K 15/1814
USPC ........................................... 358/1.13
See application file for complete search history.

(56) References Cited

U.S. PATENT DOCUMENTS

| 2003/0007179 | A1* | 1/2003 | Ferlitsch | 358/1.16 |
| 2008/0187346 | A1* | 8/2008 | Kato | 399/83 |
| 2010/0091322 | A1* | 4/2010 | Kim | 358/1.15 |
| 2010/0165380 | A1* | 7/2010 | Grams | 358/1.15 |
| 2011/0032569 | A1* | 2/2011 | Ohashi | 358/1.15 |
| 2011/0038001 | A1* | 2/2011 | Kamimura | 358/1.15 |
| 2011/0161842 | A1* | 6/2011 | Prebble | 715/760 |

* cited by examiner

*Primary Examiner* — Benjamin O Dulaney
(74) *Attorney, Agent, or Firm* — Osha Liang LLP

(57) ABSTRACT

A method for generating a hardcopy document, including: receiving, by a printer, a direct print request for an Office Open XML (OOXML) document having a plurality of pages; identifying, by the printer, a tag in the OOXML document specifying a multiple page printing feature (MPPF) for the plurality of pages, where the tag is located within a settings.xml file of the OOXML document; identifying, by the printer, a first printer setting required to implement the MPPF; invoking, by the printer, the first printer setting on the printer; and generating, by the printer and from the OOXML document, the hardcopy document with the MPPF feature after invoking the first printer setting.

20 Claims, 8 Drawing Sheets

| MPPF | TAG | REQUIRED PRINTER SETTING(S) |
|---|---|---|
| Mirror Margins | mirrorMargins | Two-Sided |
| Two pages per sheet | printTwoOnOne | Fold |
| Book Fold | bookFoldPrintSheets | Two-Sided, Fold |
| Reverse Book Fold | bookFoldRevPrinting | Two-Sided, Fold |

Table 300

PRINTER FOR RECEIVING DIRECT PRINTER REQUESTS AND MAPPING FEATURES OF THE REQUESTS TO REQUIRED SETTINGS

BACKGROUND

Although the demand for printing electronic documents (EDs) is decreasing because of recent improvements in computer displays, there are still those who generate hardcopies of EDs for purposes of reading the EDs. For example, some readers may simply prefer reading a hardcopy over staring at a computer screen. In other instances, hardcopies of the EDs may be provided to a group of people at an informal presentation, or in other situations where reading from a projector screen or computer display is not convenient.

An ED may have any number of pages. Further, a user may set/specify a multiple page printing feature (MPPF) (e.g., mirror margins, two pages per sheet, book fold, reverse book fold, hole punch, staple, cutting, etc.) of the ED. In general, the MPPFs specify the order in which the multiple pages of the ED are to be printed and/or the number of pages of the ED to be placed on a single sheet of paper, transparency, microfiche, etc. It is the responsibility of the printer driver, executing on the computing device operatively connected to the PC, to manually set the printer setting(s) required to implement the MPPF.

Direct printing is a type of printing that does not use the printer driver executing on the computing device operatively connected to the printer. As a result, the necessary printer setting(s) needed to implement the MPPF are not invoked and the expected hardcopy document with the MPPF is not achieved. Regardless, users still like direct printing EDs.

SUMMARY OF INVENTION

In general, in one aspect, the invention relates to a method for generating a hardcopy document. The method comprises: receiving, by a printer, a direct print request for an Office Open XML (OOXML) document comprising a plurality of pages; identifying, by the printer, a tag in the OOXML document specifying a multiple page printing feature (MPPF) for the plurality of pages, wherein the tag is located within a settings xml file of the OOXML document; identifying, by the printer, a first printer setting required to implement the MPPF; invoking, by the printer, the first printer setting on the printer; and generating, by the printer and from the OOXML document, the hardcopy document with the MPPF feature after invoking the first printer setting.

In general, in one aspect, the invention relates to a non-transitory computer readable storage medium storing instructions for generating a hardcopy document. The instructions comprising functionality to: receive a direct print request for an Office Open XML (OOXML) document comprising a plurality of pages; identify a tag in the OOXML document specifying a multiple page printing feature (MPPF) for the plurality of pages, wherein the tag is located within a settings xml file of the OOXML document; identify a first printer setting required to implement the MPPF; invoke the first printer setting on a printer; and generate, from the OOXML document, the hardcopy document with the MPPF feature after the first printer setting is invoked.

In general, in one aspect, the invention relates to a system for generating a hardcopy document. The system comprises: a hardware processor; a parsing module executing on the hardware processor and configured to identify, within an Office Open XML (OOXML) document, a tag specifying a multiple page printing feature (MPPF) for a plurality of pages in the OOXML document, wherein the tag is located within a settings xml file of the OOXML document; a mapping module executing on the hardware processor and configured to identify a first printer setting required to implement the MPPF; a printer configuration module executing on the hardware processor and configured to invoke the first printer setting on the printer; and a layout engine configured to generate, based on the OOXML document, a hardcopy document having the MPPF.

Other aspects of the invention will be apparent from the following description and the appended claims.

DETAILED DESCRIPTION

Figure 1:
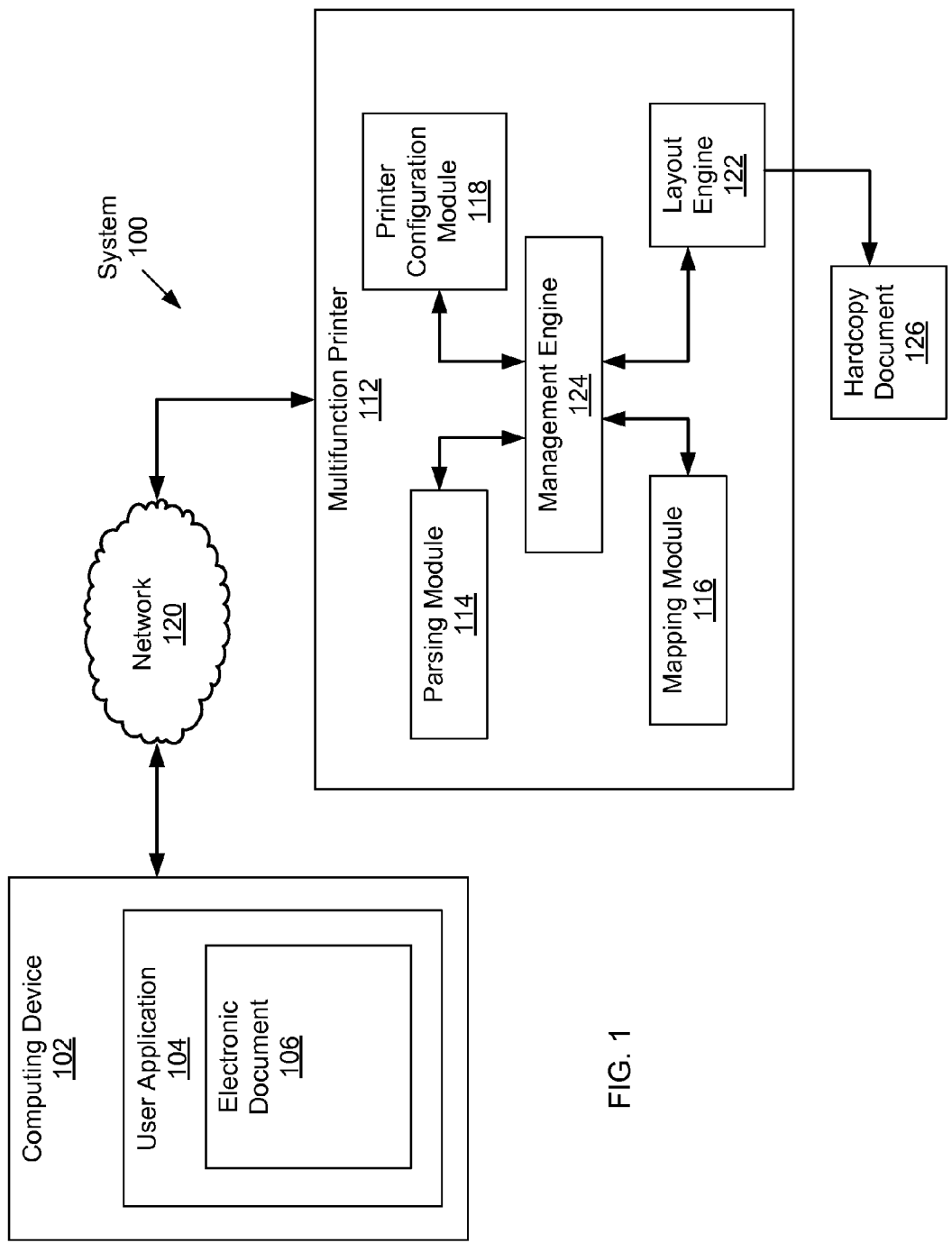
FIG. 1 shows a block diagram depicting a system in accordance in with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for generating a hardcopy document. Specifically, a printer receives a request to direct print an ED written in a document file format. The ED is parsed by the printer to identify one or more tags specifying a multiple page printing feature (MPPF), and the printer setting(s) necessary to implement the MPPF are invoked to generate the hardcopy with the requested/desired MPPF.

FIG. 1 shows a system (100) in accordance with one or more embodiments of the invention. As shown in FIG. 1, the system (100) has multiple components including a multifunction printer (MFP) (112) and a computing device (102). The MFP (112) may be configured to print, scan, fax, finish, photocopy, etc. The computing device (102) may be a personal computer (PC), a desktop computer, a mainframe, a server, a telephone, a kiosk, a cable box, a personal digital assistant (PDA), an electronic reader, a mobile phone, a smart phone, etc. There may be a direct connection (e.g., universal serial bus (USB) connection) between the computing device (102) and the MFP (112). Alternatively, the computing device (102) and the MFP (112) may be connected using a network (120) having wired and/or wireless segments. Further, the MFP (112) may include a port (not shown) for communicating with USB flash drives or any type of portable storage/memory device.

In one or more embodiments of the invention, the computing device (102) executes the user application (104). The user application (104) is a software application operated by a user and configured to obtain, input, and/or generate an ED (e.g., Electronic Document (106)) having any number of pages. Accordingly, the user application (104) may be a word-processing application, a spreadsheet application, a desktop publishing application, a graphics application, a photograph printing application, an Internet browser, etc. The user application (104) may generate new EDs and/or obtain previously saved EDs.

In one or more embodiments of the invention, the user application (104) includes one or more graphical user interfaces (GUIs) for setting/selecting MPPFs (e.g., mirror margins, two pages per sheet, book fold, reverse book fold, hole punch, staple, cutting, etc.) of the ED (106). In general, the MPPFs specify the order in which the multiple pages of the ED (106) are to be printed and/or the number of pages of the ED (106) to be placed on a single sheet of paper, transparency, microfiche, etc. Accordingly, a hardcopy document (126) of the ED (106) is generated with the selected/specified MPPFs (i.e., the page layout of the hardcopy document (126) is based on the MPPFs).

In one or more embodiments of the invention, the ED (106) is represented/defined using a document file format (e.g., Office Open XML (OOXML)) having multiple directories and/or files. The properties (i.e., settings, features, attributes) of the ED (106) may be specified using tags within one or more files and/or directories of the document file format. For example, a set or selected MPPF may be specified/recorded by a tag in a settings xml file of the document file format. Moreover, these properties (i.e., settings, features, attributes) may be needed to correctly render the ED (106) for display or printing.

In one or more embodiments of the invention, the MFP (112) includes a parsing module (114) and a mapping module (116). The parsing module (114) is configured to parse the ED (106) and identify one or more tags specifying one or more MPPFs. The mapping module (116) is configured to identify one or more printer settings (e.g., 2-sided, fold, etc.) required to implement the one or more MPPFs. In other words, the mapping module (116) maps the MPPFs specified by the identified tag(s) to one or more required printer settings. The mapping module (116) may include a look-up table that outputs the required printer setting(s) in response to an MPPF input.

In one or more embodiments of the invention, the MFP (112) includes a printer configuration module (118) and a layout engine (122). The printer configuration module (118) is configured to invoke (i.e., activate) one or more printer settings identified by the mapping module (116). The layout engine (122) is configured to calculate the positions/placement of the text characters and/or graphics of the ED (106) on a physical medium (i.e., paper, transparencies, microfilm, etc.) in view of the MPPF and the invoked printer setting(s). Accordingly, the layout engine (122) is configured to render the ED (106) for printing.

In one or more embodiments of the invention, the management engine (124) provides a link between the parsing module (114), the mapping module (116), the printer configuration module (118), and the layout engine (122). The management engine (124) may be configured to convert data or commands/messages from one format to another format in order to render the components (114, 116, 118, 122) compatible with each other. In one or more embodiments of the invention, the management engine (124) includes a GUI (not shown) for viewing one or more of the inputs and outputs of the components (114, 116, 118, 122).

Those skilled in the art, having the benefit of this detailed description, will appreciate that the parsing module (114) and the mapping module (116) may be located on the computing device (102), instead of the MFP (112). In such embodiments, once the printer setting(s) are identified, the printer settings are communicated to the printer configuration module (118).

In one or more embodiments of the invention, the ED (106) is directly printed on the MFP (112). In other words, the ED (106) is printed without using a printer driver. The ED (106) is sent to the MFP (112) (or is stored on a memory/storage device attached to a port of the MFP (112)) without being changed/converted into a page description language (PDL). Accordingly, the ED (106) may be printed without accessing the user application (e.g., user application (104)) used to generate the ED (106). Those skilled in the art, having the benefit of this detailed description, will appreciate that the ED (106) does not explicitly specify the printer settings needed to implement the MPPF requested/desired by the user. Accordingly, in a direct print scenario, if the necessary printer settings are not invoked, the hardcopy document (126) would not have the MPPF (i.e., the expected/desired output would not be obtained by the user).

Figure 2:
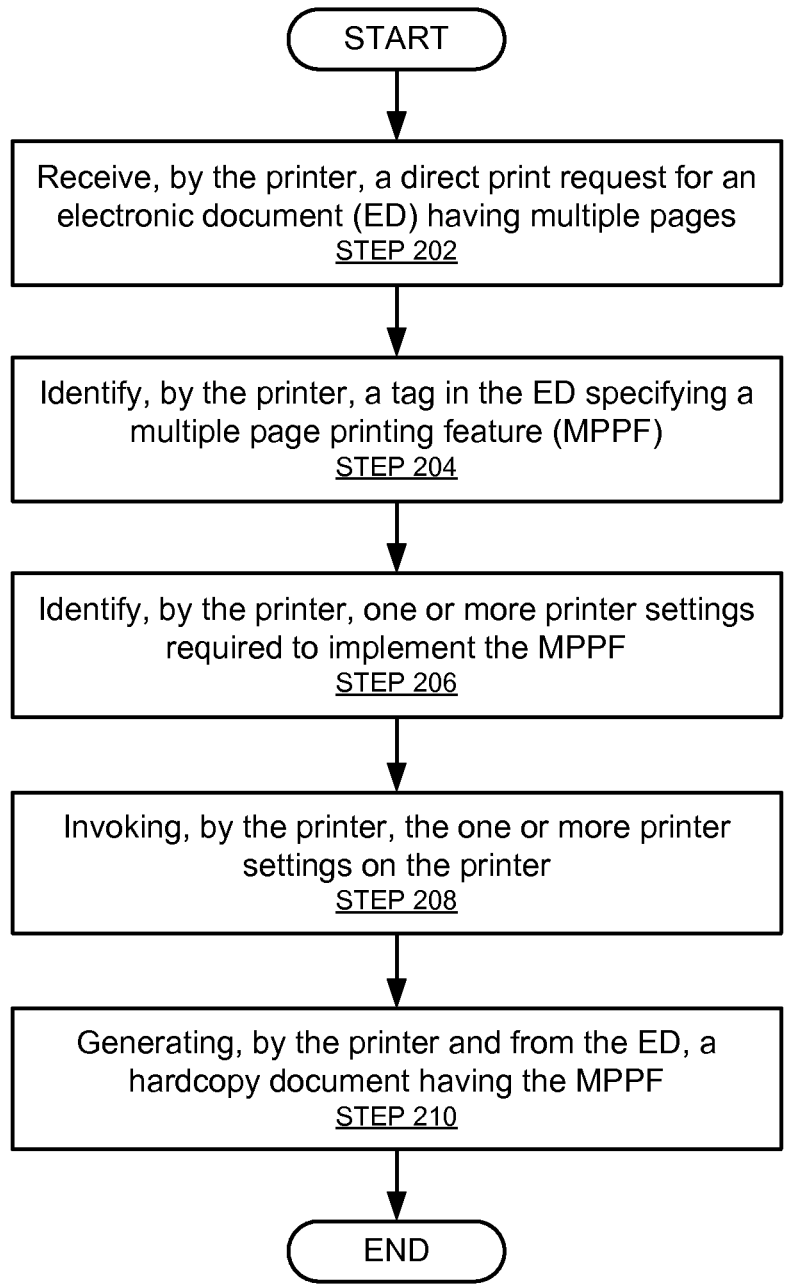
FIG. 2 shows a flowchart in accordance with one or more embodiments of the invention.

FIG. 2 shows a flowchart in accordance with one or more embodiments of the invention. The process depicted in FIG. 2 may be implemented using the system (100), described above in reference to FIG. 1. One or more steps shown in FIG. 2 may be omitted, repeated, and/or performed in a different order among different embodiments of the invention. Accordingly, embodiments of the invention should not be considered limited to the specific number and arrangement of steps shown in FIG. 2.

Initially, a request to direct print an ED having multiple pages is received by the printer (e.g., MFP (112)) (STEP 202). As discussed above, a direct print request is a request to print the ED without using the printer driver. In such a request, the ED is sent to the printer without being converted into PDL. The ED and the request to direct print the ED may come from a computing device (e.g., Computing Device (102), discussed above in reference to FIG. 1). In one or more embodiments of the invention, the ED may be obtained from a portable memory/storage device attached to a port of the printer.

In STEP 204, a tag in the ED specifying an MPPF (e.g., mirror margins, two pages per sheet, book fold, reverse book fold, hole punch, staple, cutting, etc.) is identified by the printer. In one or more embodiments of the invention, the tag specifying the MPPF is identified by parsing the ED. As discussed above, the MPPF specifies the order in which the multiple pages of the ED are to be printed and/or the number of pages of the ED to be printed per sheet of paper, transparency, microfiche, etc. As also discussed above, the ED may be represented/defined using a document file format (e.g., OOXML) having multiple directories and/or files. The properties of the ED, including the MPPF, may be stored/recorded as tags within one or more of the directories and/or files. In one or more embodiments of the invention, the tag specifying the MPPF is stored within a settings.xml file of the document file format.

Figure 3:
FIG. 3 shows a table in accordance with one or more embodiments of the invention.

In STEP 206, the one or more printer settings required to implement the MPPF are identified by the printer. In one or more embodiments of the invention, the printer setting(s) are identified from a look-up table accepting the MPPF as an input. FIG. 3 shows a table (300) relating some MPPF, tag, and printer setting(s). As shown in the table (300), the "mirror margins" MPPF is specified by the "mirrorMargins" tag in the ED. Further, the "two-sided" printer setting is required to implement the "mirror margins" MPPF. As another example, as shown in the table (300), the "book fold" MPPF is specified by the "bookFoldPrintSheets" tag in the ED. Further, both the "two-sided" printer setting and the "fold" printer setting are required to implement the "book fold" MPPF. As yet another example, as shown in the table (300), the "two pages per sheet" MPPF is specified by the "printTwoOnOne" tag in the ED. Further, the "fold" printer setting is required to implement the "two pages per sheet" MPPF.

Referring back to FIG. 2, in STEP 208, the one or more required printer setting(s) are invoked and then a hardcopy document with the MPPF is generated from the ED (STEP 210). In other words, the text, if any, of the ED and the figures, if any, of the ED are placed on a physical medium (i.e., paper, transparency, microfiche, etc.) in accordance with the printer setting(s) required to implement the MPPF. In one or more embodiments of the invention, generating the hardcopy document requires interpreting and rasterizing the ED.

Those skilled in the art, having the benefit of this detailed description, will appreciate that in alternate embodiments, one or more of the steps in FIG. 2 may be performed by a computing device (e.g., Computing Device (102)) operatively connected to the printer. In such embodiments, the computing device identifies the tag in the ED specifying the MPPF, identifies the one or more printer settings required to implement the MPPF, and instructs the printer to invoke the one or more printer settings.

FIGS. 4A, 4B, 4C, and 4D show examples in accordance with one or more embodiments of the invention. Specifically, FIGS. 4A, 4B, 4C, and 4D are examples of the "mirror margins" MPPF, the "two pages per sheet" MPPF, the "book fold" MPPF, and the "reverse book fold" MPPF, respectively.

Figure 4A:
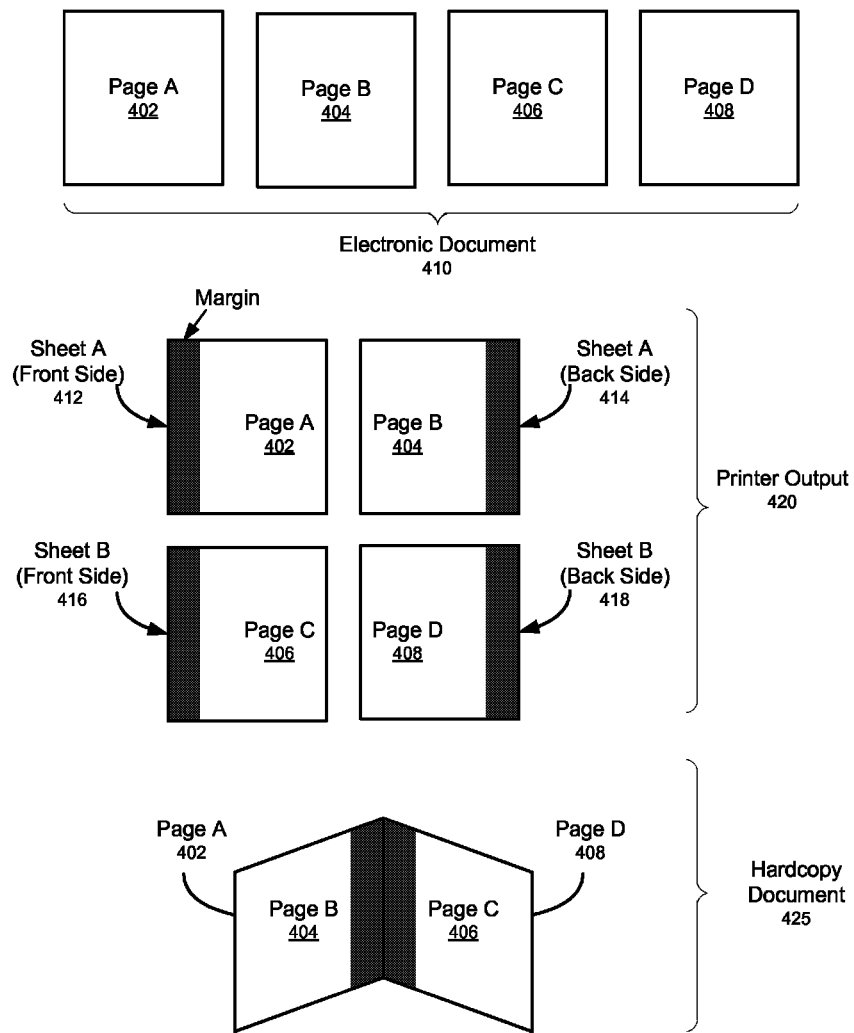
FIGS. 4A, 4B, 4C, and 4D show examples in accordance with one or more embodiments of the invention.

In FIG. 4A, there exists an ED (410) having multiple pages (i.e., Page A (402), Page B (404), Page C (406), Page D (408)). Further, the ED (410) includes a tag specifying the "mirror margins" MPPF. A request to direct print the ED (410) is sent to a printer. The printer identifies the tag and invokes the "two-sided" printer setting to implement the "mirror margins" MPPF. Accordingly, the printer output (420) includes two sheets: Sheet A and Sheet B. Page A (402) is placed on the front side of Sheet A (412), while Page B (404) is placed on the back side of Sheet A (414). Moreover, Page C (406) is placed on the front side of Sheet B (416), while Page D (408) is placed on the back side of Sheet B (418). Further still, because of the "mirror margins" MPPF, there exists two separate margin settings: one margin for even pages (i.e., Page A (402), Page C (406)); and one margin for odd pages (i.e., Page B (404), Page D (408)). The printer output (420) may be assembled into the hardcopy document (425).

Figure 4B:
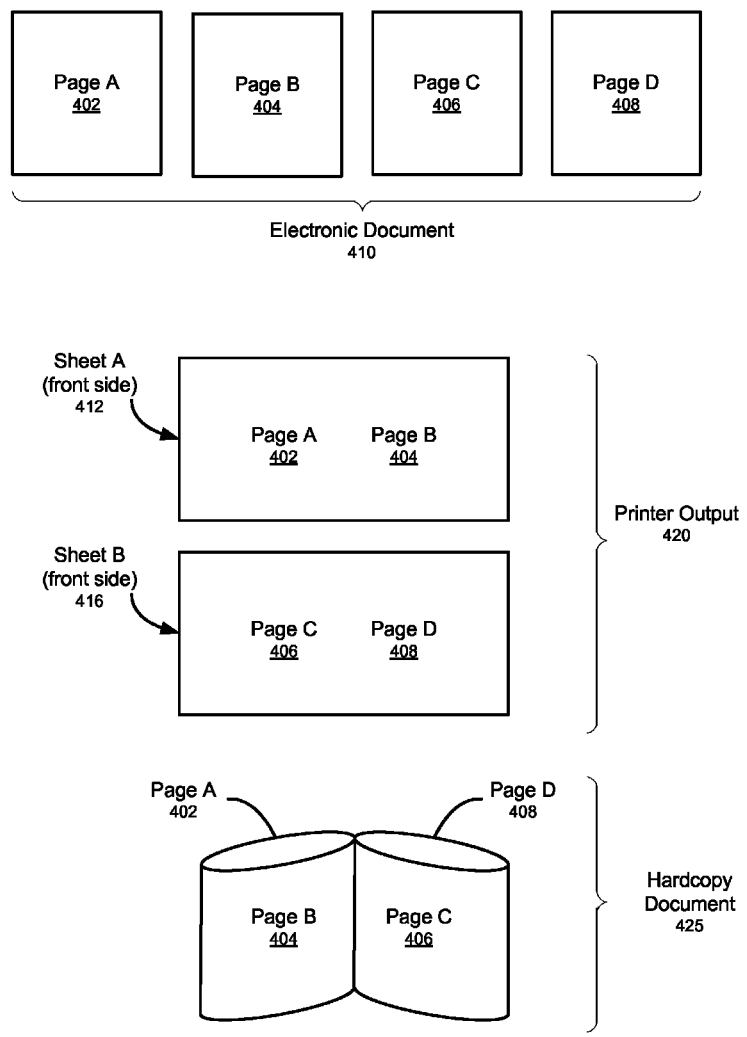

In FIG. 4B, there exists an ED (410) having multiple pages (i.e., Page A (402), Page B (404), Page C (406), Page D (408)). Further, the ED (410) includes a tag specifying the "two pages per sheet" MPPF. A request to direct print the ED (410) is sent to a printer. The printer identifies the tag and invokes the "fold" printer setting to implement the "two pages per sheet" MPPF. Accordingly, the printer output (420) includes two sheets: Sheet A and Sheet B. Page A (402) and Page B (404) are placed on the front side of Sheet A (412). Page C (406) and Page D (408) are placed on the front side of Sheet B (416). The printer output (420) may be assembled into the hardcopy document (425).

Figure 4C:
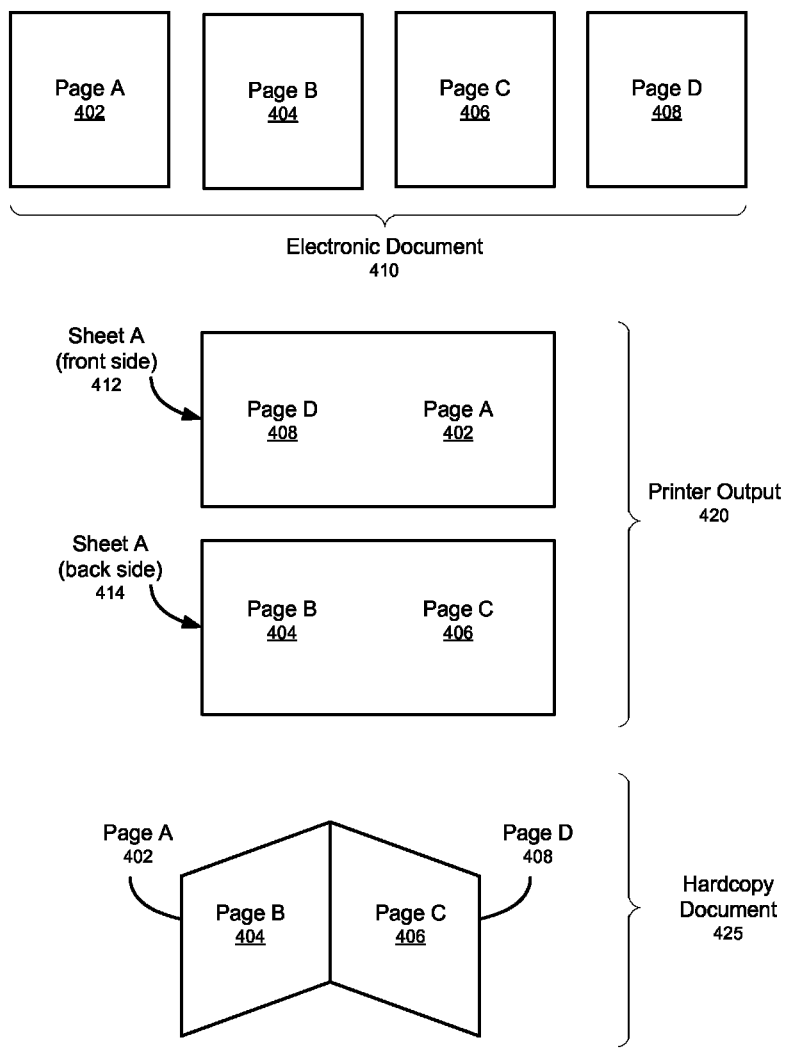

In FIG. 4C, there exists an ED (410) having multiple pages (i.e., Page A (402), Page B (404), Page C (406), Page D (408)). Further, the ED (410) includes a tag specifying the "book fold" MPPF. A request to direct print the ED (410) is sent to a printer. The printer identifies the tag and invokes the "fold" printer setting and the "two-sided" printer setting to implement the "book fold" MPPF. Accordingly, the printer output (420) includes one sheet: Sheet A. Page A (402) and Page D (408) are placed on the front side of Sheet A (412). Page C (406) and Page B (404) are placed on the back side of Sheet A (414). The printer output (420) may be assembled into the hardcopy document (425).

Figure 4D:
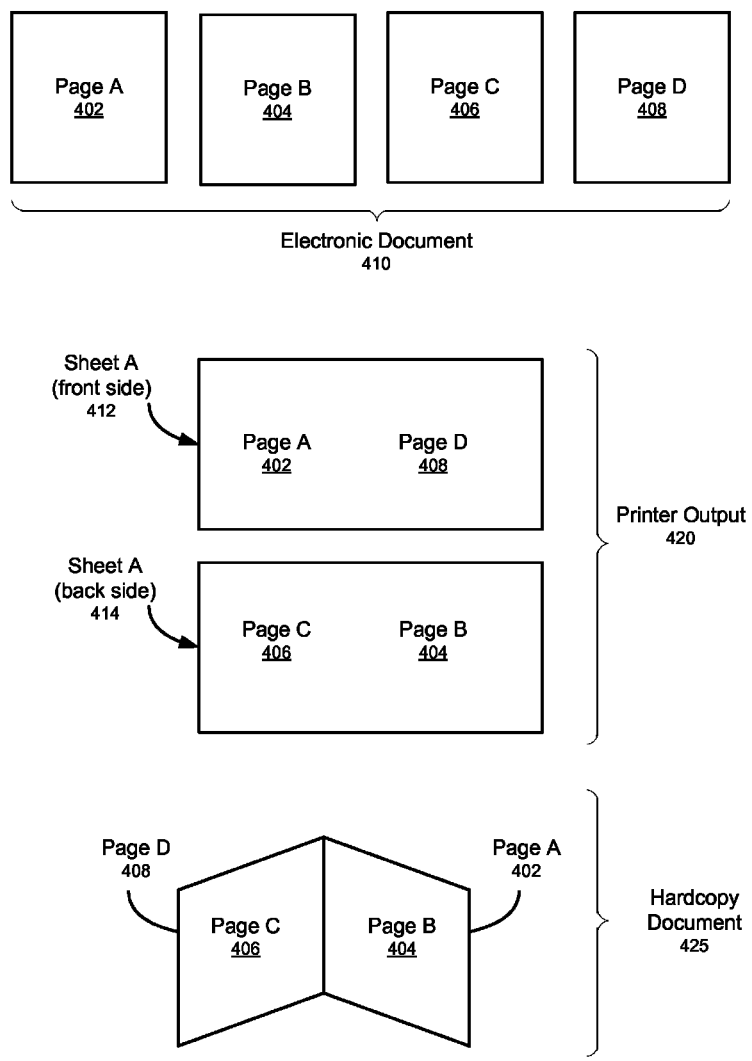

In FIG. 4D, there exists an ED (410) having multiple pages (i.e., Page A (402), Page B (404), Page C (406), Page D (408)). Further, the ED (410) includes a tag specifying the "reverse book fold" MPPF. A request to direct print the ED (410) is sent to a printer. The printer identifies the tag and invokes the "fold" printer setting and the "two-sided" printer setting to implement the "reverse book fold" MPPF. Accordingly, the printer output (420) includes one sheet: Sheet A. Page A (402) and Page D (408) are placed on the front side of Sheet A (412). Page C (406) and Page B (404) are placed on the back side of Sheet A (414). The printer output (420) may be assembled into the hardcopy document (425).

Embodiments of the invention have one or more of the following advantages: the ability to implement an MPPF in a direct print scenario; the ability to avoid using a printer driver to manually invoke the printer setting(s) needed to implement an MPPF; the ability to automatically invoke, by a printer, the printer setting(s) needed to implement an MPPF using tags in a document file format; the ability to print an ED specifying an MPPF from a portable memory/storage device connected to a port of the printer; etc.

Figure 5:
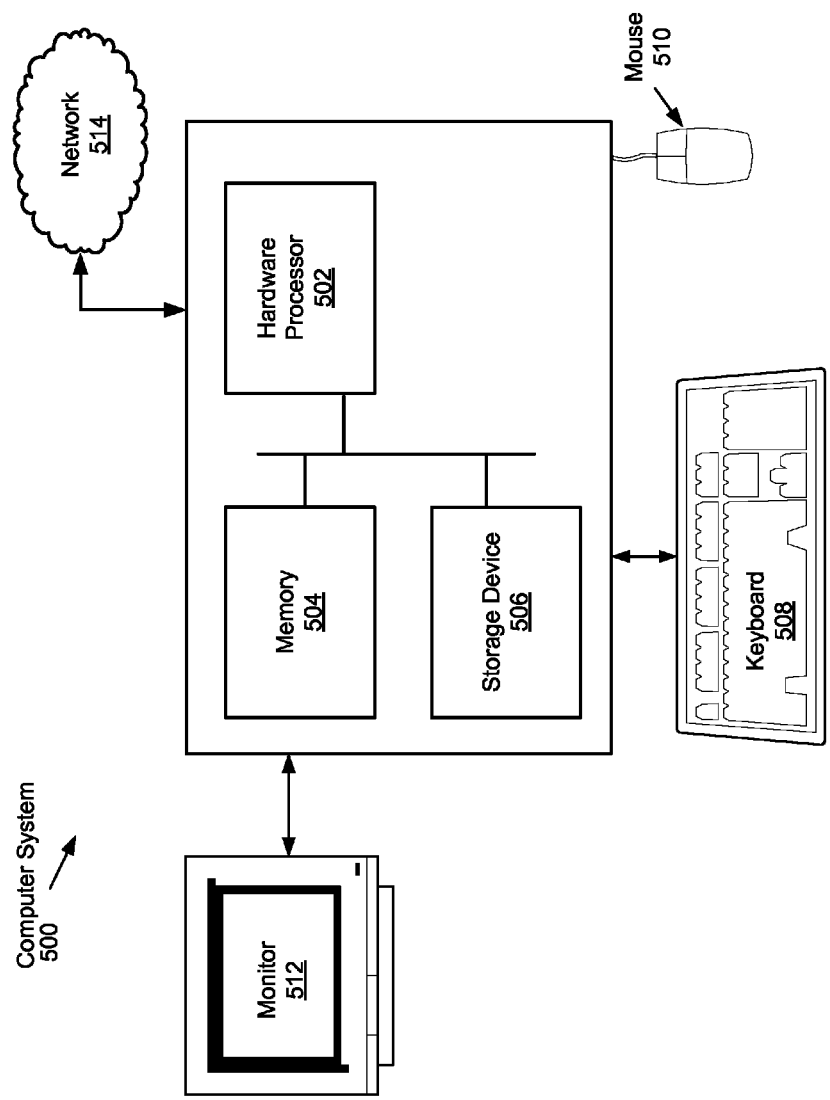
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more hardware processor(s) (502) (such as a central processing unit (CPU), integrated circuit, etc.), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer system (500) may also include input means, such as a keyboard (508), a mouse (510), or a microphone (not shown). Further, the computer system (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system (500) includes at least the minimal processing, input, and/or output means necessary to practice embodiments of the invention.

Further, in one or more embodiments of the invention, one or more elements of the aforementioned computer system (500) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a non-transitory computer readable storage medium, such as a compact disc (CD), a diskette, a tape, a hard drive, punch cards, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating a hardcopy document, comprising:
   receiving, by a printer, a direct print request for an Office Open XML (OOXML) document comprising a plurality of pages, wherein the direct print request is issued without using a printer driver;
   parsing, by the printer, the OOXML document to identify a tag specifying a multiple page printing feature (MPPF) for the plurality of pages, wherein the tag is located within a settings.xml file of the OOXML document;
   identifying, by the printer, a first printer setting required to implement the MPPF by accessing a look-up table associating the tag specifying the MPPF with the first printer setting;
   invoking, by the printer, the first printer setting on the printer; and
   generating, by the printer and from the OOXML document, the hardcopy document with the MPPF feature after invoking the first printer setting.

2. The method of claim 1, wherein the MPPF is hole punch.

3. The method of claim 1, wherein the MPPF is staple.

4. The method of claim 1, wherein the MPPF is mirror margins, and wherein the first printer setting is 2-sided.

5. The method of claim 1, wherein the MPPF is two pages per sheet, and wherein the first printer setting is fold.

6. The method of claim 1, further comprising:
   identifying, by the printer, a second printer setting required to implement the MPPF; and
   invoking, by the printer and before generating the hardcopy document, the second printer setting on the printer.

7. The method of claim 6, wherein the MPPF is book fold, wherein the first printer setting is 2-sided, and wherein the second printer setting is fold.

8. The method of claim 6, wherein the MPPF is reverse book fold, wherein the first printer setting is 2-sided, and wherein the second printer setting is fold.

9. A non-transitory computer readable medium storing instructions for generating a hardcopy document, the instructions comprising functionality to:
   receive, using a printer, a direct print request for an Office Open XML (OOXML) document comprising a plurality of pages, wherein the direct print request is issued without using a printer driver;
   parse, using the printer, the OOXML document to identify a tag specifying a multiple page printing feature (MPPF) for the plurality of pages, wherein the tag is located within a settings.xml file of the OOXML document;
   identify, using the printer, a first printer setting required to implement the MPPF by accessing a look-up table associating the tag specifying the MPPF with the first printer setting;
   invoke, using the printer, the first printer setting on a printer; and
   generate, from the OOXML document and using the printer, the hardcopy document with the MPPF feature after the first printer setting is invoked.

10. The non-transitory computer readable medium of claim 9, wherein the MPPF is hole punch.

11. The non-transitory computer readable medium of claim 9, wherein the MPPF is staple.

12. The non-transitory computer readable medium of claim 9, wherein the MPPF is mirror margins, and wherein the first printer setting is 2-sided.

13. The non-transitory computer readable medium of claim 9, wherein the MPPF is two pages per sheet, and wherein the first printer setting is fold.

14. The non-transitory computer readable medium of claim 9, the instructions further comprising functionality to:
   identify a second printer setting required to implement the MPPF; and
   invoke, before the hardcopy document is generated, the second printer setting on the printer.

15. The non-transitory computer readable medium of claim 14, wherein the MPPF is book fold, wherein the first printer setting is 2-sided, and wherein the second printer setting is fold.

16. The non-transitory computer readable medium of claim 14, wherein the MPPF is reverse book fold, wherein the first printer setting is 2-sided, and wherein the second printer setting is fold.

17. A printer, comprising:
   a hardware processor configured to receive a direct print request for an Office Open XML (OOXML) document comprising a plurality of pages, wherein the direct print request is issued without using a printer driver;
   a parsing module executing on the hardware processor and configured to parse the OOXML document to identify a tag specifying a multiple page printing feature (MPPF) for the plurality of pages in the OOXML document, wherein the tag is located within a settings.xml file of the OOXML document;
   a mapping module executing on the hardware processor and comprising a look-up table associating a first printer setting required to implement the MPPF with the tag specifying the MPPF;
   a printer configuration module executing on the hardware processor and configured to invoke the first printer setting on the printer; and
   a layout engine configured to generate, based on the OOXML document, a hardcopy document having the MPPF.

18. The printer of claim 17, wherein the look-up table further associates a second printer setting required to implement the MPPF with the tag specifying the MPPF, and wherein the printer configuration module is further configured to invoke the second printer setting on the printer.

19. The printer of claim 18, wherein the MPPF is one selected from a group consisting of book fold and reverse book fold, wherein the first printer setting is fold, and wherein the second printer setting is 2-sided.

20. The printer of claim 17, wherein the MPPF is one selected from a group consisting of hole punch, staple, and cutting.

* * * * *